July 29, 1924.
J. F. MILLIGAN
CONFECTION
Filed May 20, 1922
1,502,864
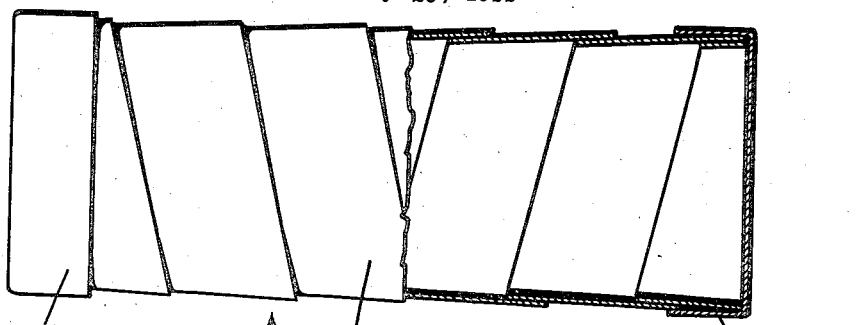
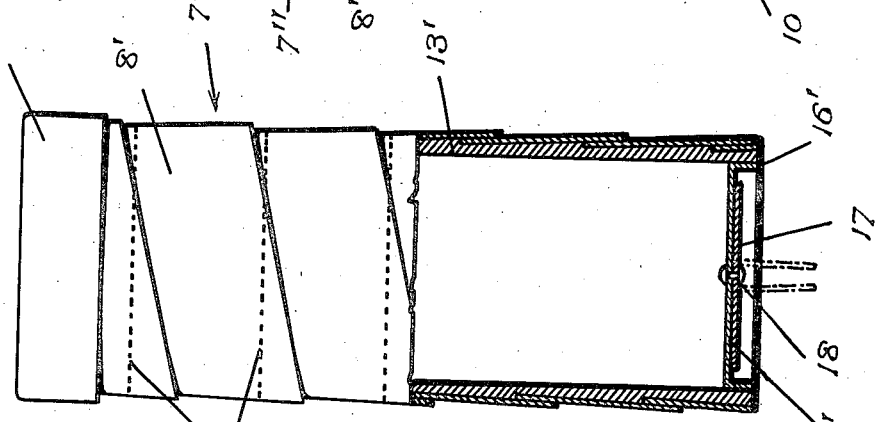
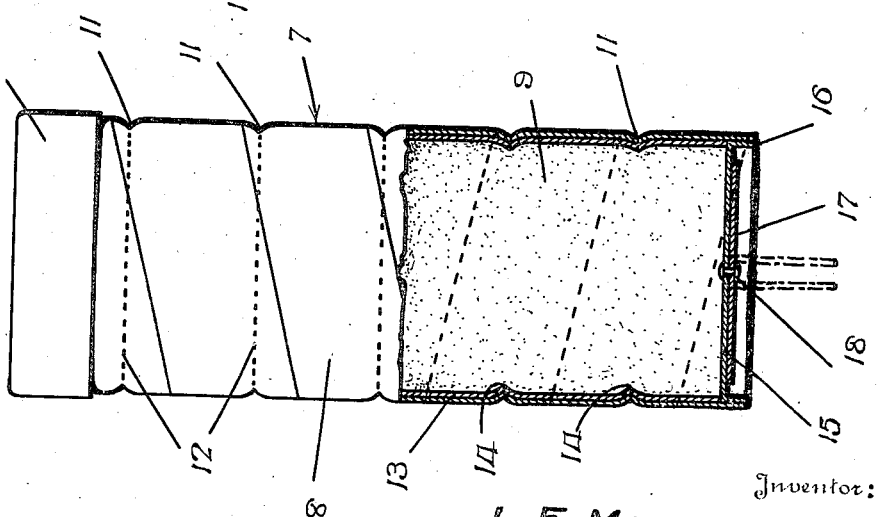
Inventor:
J. F. MILLIGAN,
By W. T. Fitz Gerald & Co.
Attorney.

Patented July 29, 1924.

1,502,864

UNITED STATES PATENT OFFICE.

JOSEPH F. MILLIGAN, OF SWISSVALE, PENNSYLVANIA.

CONFECTION.

Application filed May 20, 1922. Serial No. 562,378.

*To all whom it may concern:*

Be it known that I, JOSEPH F. MILLIGAN, a citizen of the United States, residing at Swissvale, in the county of Allegheny and State of Pennsylvania, have invented certain new and useful Improvements in Confections; and I do hereby declare the following to be a full, clear, and exact description of the invention, such as will enable others skilled in the art to which it appertains to make and use the same.

The present invention relates to confections, and aims to provide a novel and improved container for an individual serving of ice cream, pudding, dessert or other filling of frozen or semi-solid edible, in order that the article can be conveniently handled, and held in the hand while eaten.

Another object of the invention is the provision of a novel wrapper or carton for enclosing the filler, to protect same during the handling of the confection, as well as protecting the contents from the air, dirt, moisture, heat, and the like, and which provides for the exposing of the filling to enable it to be eaten while holding the remaining portion of the wrapper or container in the hand.

A further object is the provision of a tubular wrapper or shell for holding the filling, and enabling the shell or wrapper to be torn away, piece by piece, as the filling is eaten.

A still further object of the invention is the provision within the wrapper or shell of pastry or other edible in which the ice cream or other filling is disposed, whereby the wrapper or outer shell being removed, enables the filling to be eaten with the pastry or edible shell, like, in a way, the ordinary ice cream cone.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Fig. 1 is a view, partly in elevation and partly in longitudinal section, showing one form of the improved article of confection.

Fig. 2 is a similar view showing a modification.

Fig. 3 is a similar view showing still another variation.

Referring to Fig. 1, there is shown therein a tubular outer shell or wrapper 7 forming part of the container, and composed of a helically wound strip 8 of paper, foil, or any other suitable material, which can be unwound or torn off. Such tubular shell contains the filling 9 of ice cream, pudding, dessert, custard or other frozen or semi-solid edible, providing a stick to be eaten while held in the hand. The filling provides an individual serving for one person, and is protected by the outer shell in the handling of the article.

A removable cap 10 is fitted on the upper end of the shell, and a bottom or lower end closure 15 is fitted in the lower end portion of the shell, for excluding foreign matter. The bottom or lower end member 15 has an outturned rim 16 fitted within the lower projecting end portion of the shell or wrapper 7 below the lower end of the filling 9, and said bottom is provided with a handle or finger piece for holding the article while eating the filling. Thus, a disk or piece 17 of card board, paper or other foldable or bendable material is disposed against the lower surface of the bottom 15, and is secured centrally to the bottom by means of a staple, rivet or other securing element 18, to hold said piece in place against the bottom within the rim 16 thereof, so that said piece is set in and located out of the way. The opposite halves or leaves of the piece 18 can be bent away from the bottom 15 and folded together, as shown in dotted lines, thereby providing a handle or finger piece to be held between the thumb and fingers, for conveniently supporting and handling the article, and enabling the filling 9 to be eaten down to the bottom without any difficulty or annoyance in holding the article.

In order to facilitate the tearing off of the strip 8 when portions thereof are unwound from the filling, to expose the filling so that it can be eaten, the tube or shell 7 is formed at longitudinally spaced points with annular creases or scores 11 and also perforations 12 along said creases or scores, which divide the tube or shell into zones. In some cases, the creases or scores can be used without the perforations 12, and in other cases the perforations themselves will suffice.

When the stick or filling 9 is to be eaten, the end cap 10 is removed and the piece 17 bent or folded outwardly to provide a handle or finger piece for holding the article, and by catching hold of the corresponding end of the strip 8, said strip can be unwound and torn off along the first or second line of perforations 12, thereby exposing the filling, so that it can be conveniently eaten. Additional portions or zones of the shell or tube 7 can be torn off as needed until the entire shell or tube is removed.

As shown in Fig. 1, an inner shell 13 is disposed within the tube or outer shell 7, around which the strip 8 is wound, and the inner shell is composed of suitable pastry or other edible material, which assists in holding the article in shape during handling. This inner edible shell also retains the filling 9 in place, when the outer shell or tube is removed piece by piece, and the inner shell is eaten with the filling substantially the same as an ice cream cone. As shown, the inner shell 13 also has annular creases or indentations 14 behind the creases or indentations 11, enabling the shell 13 to be broken off for eating the filling in chunks, one at a time. The confection can be prepared in different ways. The filling 9 may be placed in the container at the factory, and the complete article supplied to the trade, or the article can be completed when served to the customer, in which case the ice cream or other filling 9 is placed in the shell by the person serving the customer. It is also possible to supply the shells 7 and 13 separately, in which case, the inner shell can be placed within the outer shell, and the inner shell then filled with the ice cream or other filling.

Fig. 2 illustrates a modified form of container, wherein the strip 8' of the outer tube or shell 7' is wound with the edges thereof overlapping, and said shell or tube has the spaced annular lines of perforations 12' for tearing off the pieces of the shell in zones.

In this modification, there is also shown an inner pastry or edible shell 13' which is provided by spraying or otherwise coating the interior of the outer shell or tube 7' with pastry or other edible, and such coating in adhering to the outer shell will provide the inner edible shell, from which the strip 8' can be removed to expose the inner shell to be eaten with the filling. In this modified form, the bottom 15' and its rim 16' are disposed within the lower end portion of the shell lining or inner shell 13', whereas, as shown in Fig. 1, the bottom is fitted within the lower projecting terminal of the outer shell below the lower end of the inner shell or lining.

Fig. 3 illustrates an outer shell or tube 7'' composed of the strip 8'' wound with its edges overlapping, the same as in Fig. 2, without the inner shell, and the filling is placed directly in the shell 7''. In this form, both ends of the shell have the caps 10 fitted thereon.

Having thus described the invention, what is claimed as new is:—

1. A shell for holding an edible filling having a closure at one end, and means carried by said closure and normally disposed flatly thereagainst, and bendable away from said closure to provide a finger piece to be held between the thumb and fingers for supporting the shell, the shell being adapted to be torn away from the opposite end.

2. A shell for holding an edible filling having a closure at one end, and a piece secured to said closure and having opposite portions to be folded together to provide a finger piece to be held between the thumb and fingers for supporting the shell, the shell being adapted to be torn away from the opposite end to expose the filling.

3. A shell for holding an edible filling, a bottom to fit in one end portion of the shell and having an outturned rim, and means carried by said bottom within said rim and bendable away from the bottom to provide a finger piece to be held between the thumb and fingers for supporting the shell, the shell being adapted to be torn away from the opposite end to expose the filling.

4. A shell for holding an edible filling, a bottom to fit within one end portion of said shell having an outturned rim, and a piece secured centrally to the bottom within said rim and having opposite portions to be bent away from the bottom and folded together to provide a finger piece to be held between the thumb and fingers for supporting the shell, the shell being adapted to be torn away from the opposite end to expose the filling.

In testimony whereof I have signed my name to this specification in the presence of two subscribing witnesses.

JOSEPH F. MILLIGAN.

Witnesses:
 W. B. CRAIGHEAD,
 C. W. MILLIGAN.